United States Patent [19]

Sakamoto

[11] Patent Number: 5,436,660
[45] Date of Patent: Jul. 25, 1995

[54] IMAGE SENSING APPARATUS HAVING PLURALITY OF OPTICAL SYSTEMS AND METHOD OF OPERATING SUCH APPARATUS

[75] Inventor: Yukio Sakamoto, Yaita, Japan

[73] Assignee: Sharp Kabushiki Kaisha, Osaka, Japan

[21] Appl. No.: 849,672

[22] Filed: Mar. 11, 1992

[30] Foreign Application Priority Data

Mar. 13, 1991 [JP] Japan .................................. 3-048135
Feb. 25, 1992 [JP] Japan .................................. 4-037575

[51] Int. Cl.⁶ ............................................ H04N 5/225
[52] U.S. Cl. ..................................... 348/207; 348/229; 348/262
[58] Field of Search ....................... 358/41, 22, 93, 209, 358/227, 335, 29 C, 91, 88, 909; H04N 5/225; 348/207, 231, 239, 345, 362, 255, 262, 229

[56] References Cited

U.S. PATENT DOCUMENTS

| 3,612,764 | 10/1971 | Gilkeson et al. | 358/108 |
| 4,998,162 | 3/1991 | Kondo et al. | 358/41 |
| 5,005,083 | 4/1991 | Grage et al. | 358/181 |
| 5,175,615 | 12/1992 | Ghara | 358/29 C |

FOREIGN PATENT DOCUMENTS

| 0342419 | 4/1989 | European Pat. Off. | H04N 5/33 |
| 1-238285 | 9/1989 | Japan | H04N 5/225 |
| 2143683 | 6/1990 | Japan | H04N 5/225 |
| 2-179078 | 7/1990 | Japan | H04N 5/225 |
| 1587661 | 8/1990 | U.S.S.R. | H04N 5/225 |

OTHER PUBLICATIONS

Nuclear Engineering Intl. vol. 35, No. 436, 11-90, Haywards Heath GB, pp. 44–45, Abel et al, "3D TV–Looking Forward in Depth".
IIEE Transactions on Consumer Electronics, vol. 37, No. 1, 02–91, New York US pp. 39–43, Takemura et al., "Stereoscopic Video Movie Camera using 300K Pixel IT-CCD Sensors".
Conference and Exhibition on Television Techniques–12–14 Jun. 1990–Budapest, Hungary, pp. 63–70; Tichit "Trends in CCD Studio Cameras".

Primary Examiner—Joseph Mancuso
Assistant Examiner—Tuan V. Ho

[57] ABSTRACT

A video camera or a camcorder including: a first conversion portion for converting an object image captured by first lenses into an electrical signal; a second conversion portion for converting an object image captured by second lenses into an electrical signal provided independently from the signal from the first lenses; a video signal producing portion provided commonly for both conversion portions for producing a video signal based on the electrical signals converted by these converting portions, in order to implement an image sensing apparatus; and an image sensing apparatus with recording function which has the function of reproducing a plurality of object images captured by a plurality of optical systems by switching them or combining them, in a structure advantageous for cost reduction as well as size reduction. A switching circuit for selectively applying either one of the output signals of the conversions portions is provided between the conversion portions and the video signal producing portion.

12 Claims, 11 Drawing Sheets

IMAGE SENSING APPARATUS HAVING PLURALITY OF OPTICAL SYSTEMS AND METHOD OF OPERATING SUCH APPARATUS

BACKGROUND OF THE INVENTION

1. Field of the Invention

The present invention relates generally to image sensing apparatuses, and more specifically, to multi-picture frame processing function.

2. Description of the Related Art

Among various image sensing apparatuses presently commercially available include a video camera with a recording function (a camcorder), a vide camera without any recording function, etc., any of these has only one system of circuitry for sensing the image of an object.

FIG. 7 is a block diagram schematically showing the entire structure of a conventional video camera. Referring to FIG. 7, light reflected from an object (not shown) is taken up into the video camera by lenses 11. The light taken up by lenses 11 forms the optical image of the object on the light receiving surface of an image sensing device 12 through the opening of an iris 17. Image sensing device 12 is formed of a CCD (Charge Coupled Device), etc. Image sensing device 12 converts the optical image formed on the light receiving surface into an electrical signal and applies the signal to a CDS (Correlation Double Sampling) circuit 13. CDS circuits 13 restrains low band noise included in the electrical signal applied from image sensing device 12. The electrical signal having its low band noise restrained by CDS circuit 13 is applied to an AGC (Automatic Gain Control) amplifier 14 and an iris control circuit 16.

AGC amplifier 14 amplifies or attenuates the electrical signal from CDS circuit 13 under the control of AGC control circuit, and controls the signal at a prescribed level suitable for processing in signal processing circuitry in succeeding stages. More specifically, AGC amplifier 14 is-a variable gain amplifier, while AGC control circuit 15 outputs a control signal for controlling the gain of AGC amplifier 14. AGC control circuit 15 responds to an output signal from AGC amplifier 14 and outputs a control signal in accordance with the difference between the output signal level of AGC amplifier 14 and the above stated prescribed level. If the output signal level of AGC amplifier 14 is lower than the prescribed level, AGC control circuit 15 controls AGC amplifier 14 so as to increase its gain, and if the output signal level of AGC amplifier 14 is higher than the prescribed level, AGC control circuit 15 controls AGC amplifier 14 so as to lower its gain. Consequently, the output signal level of AGC amplifier 14 is kept constantly at the prescribed level.

Iris control circuit 16 adjust the diameter of the opening of iris 17 so that the output signal level of CDS circuit 13 is always constant. When the opening diameter of iris 17 becomes larger, the amount of incident light upon the light receiving surface of image sensing device 12 increases, and, therefore, the output level of CDS circuit 13 rises. Conversely, when the opening diameter of iris 17 becomes smaller, the amount of incident light upon the light receiving surface of image sensing device 12 decreases, and, therefore, the output signal level of CDS circuit 13 decreases. Iris control circuit 16 therefore operates to reduce the opening diameter of iris 17 when the output signal level of CDS circuit 13 becomes higher than a certain reference level, while operates to increase the opening diameter of iris when the output signal level of CDS circuit 13 becomes lower than the reference level. Thus, the amount of incident light upon the light receiving surface of image sensing device 12 is always kept substantially constant, and, therefore, the output signal level of CDS circuit 13 is always kept substantially constant.

The electrical signal having its level controlled by AGC amplifier 14 is applied to an LPF (Low Pass Filter) 18 and a pixel separating circuit 110. LPF 18 extracts the low frequency component of the electrical signal applied from AGC amplifier 14. The low frequency component extracted by LPF 18 undergoes a prescribed processing by a Y signal processing circuit 19 and becomes a luminance signal Y representing the brightness of the above stated optical image.

Pixel separating circuit 110 separates the electrical signal applied from AGC amplifier 14 as for every pixel on the light receiving surface of image sensing device 12, and produces two kinds of signals containing different kinds of color information. These two kinds of signals produced by pixel separating circuit 110 are subjected to a prescribed operation by a matrix circuit 111 and converted into three primary color signals R, G and B.

These primary color signals R, G and B are input into a white balance circuit 116. White balance circuit 116 controls the gains of the primary color signals R, G and B so that white balance is made.

Generally, a color sensing apparatus such as color video camera possesses white balance function for reproducing the color of an object recognized by human eyes on a picture plane.

Human eyes recognize a white object as white regardless of its change as long as the color temperature of light illuminating the object to be seen is within a certain range. However, the higher the color temperature of light illuminating is, the more bluish the color of the object recognized by the image sensing device becomes while the lower the color temperature of the light illuminating, the more reddish the color of the object recognized by the device becomes. In other words, the color recognized by the image sensing device and the color recognized by human eyes are different depending upon the color temperatures of illuminating light.

Therefore, a color image sensing apparatus is provided with white balancing function which automatically adds a correction to color information obtained by sensing the image of an object depending upon the color temperature of the light illuminating the object. In the image sensing apparatus shown in FIG. 7, the white balancing function is implemented by white balance circuit 116.

Matrix circuit 112 further subjects the primary color signals R, G and B having their gains controlled by white balance circuit 116 to a prescribed operation and produces two color difference signals R - Y and B - Y.

More specifically, white balance circuit 116 corrects the gains of the primary color signals R, G and B from matrix circuit 111 so that the average level of each of the color difference signals R - Y and B - Y for one picture plane becomes zero or a prescribed value close to zero.

A white object can thus be reproduced white on a picture plane regardless of the color temperature of light illuminating by controlling the gains of the primary color signals so that the average levels of the color difference signals R - Y and B - Y approximately equal to the value (0) corresponding to "WHITE".

Which value the average level of each of the color difference signals R - Y and B - Y for one picture plane takes by controlling the gains of the primary color signals from R, Y and B by white balance circuit 116 is predetermined in accordance with the spectroscopic characteristics of lenses 11 and image sensing device 12, and white balance circuit 116 is designed depending upon the value.

The color difference signals R - Y and B - Y produced by matrix circuit 112 is applied to an encoder circuit 113. Encoder circuit 113 balanced modulates these color difference signals R - Y and B - Y with a sub-carrier wave of 3.58 MHz and produces a chroma signal C.

The luminance signal Y and chroma signal C produced by Y signal processing circuit 19 and encoder circuit 113, respectively are mixed by an adder 114. A signal obtained by this mixing is the video signal of the above-stated optical image. The video signal is externally output through an output circuit 115.

In Y signal processing circuit 19, various processing such as gamma correction, blanking processing, contour compensation processing, white clipping, set up processing, and mixing of synchronizing signals are conducted.

A timing generator 240 generates timing pulses for controlling the operation timings of image sensing device 12 and CDS circuit 13. A synchronizing signal generator 250 generates synchronizing signals for controlling the operation timings of the internal-circuits in automatic gain amplifier 14 and video signal producing portion 300. Timing generator 240 and synchronizing signal generator 250 are controlled by a horizontal synchronizing signal HD, a vertical synchronizing signal VD, etc. and synchronizes with each other. More specifically, the timing pulses which determine the operation timing of an electrical signal generation portion 2000 and the synchronizing signals which determine the operation timing of video signal producing portion 300 are generated in synchronization with each other.

Consequently, conversion of the optical image of the object into an electrical signal in electrical signal generation portion 2000 and conversion of the electrical signal from conversion portion 200 into a video signal in video signal producing portion 300 are conducted by appropriate timings.

FIG. 8 is a block diagram schematically showing the entire structure of a camera video tape recorder. Referring to FIG. 8, a description of the structure and operation of this conventional camcorder follows.

The camcorder includes an image sensing portion 100 for converting the optical image of an object into a video signal from which a video image can be reproduced on the picture frame of a light receiving surface, and a recording portion 400 for recording on a magnetic tape video signals Y and C produced at image sensing portion 100. Image sensing portion 100 includes the conversion portion 200 and video signal producing portion 300 of the conventional video camera (see FIG. 8). As is the case with the conventional video camera, the operation timings of conversion portion 200 and video signal producing portion 300 are controlled by timing generator 240 and synchronizing signal generator 250 which operate in synchronization with each other.

A luminance signal Y and a-chroma signal C produced by video signal producing portion 300 are input into an FM modulator 401 and a low band converter 402 at recording portion 400.

FM modulator 401 FM-modulates the luminance signal Y and applies the FM modulated luminance signal Y (hereinafter simply referred to as FM luminance signal) to a recording amplifier 403.

Low band converter 402 converts the frequency band of the chroma signal C into a prescribed low band which is lower than the frequency band of the FM luminance signal, and applies the converted chroma signal C (hereinafter simply referred to as low band chroma signal) to recording amplifier 403.

Recording amplifier 403 mixes the FM luminance signal and low band converted chroma signal and produces a video signal suitable for recording onto a magnetic tape 404. The video signal is recorded on the magnetic tape 404 by a head HW for recording.

As described above, the image sensed by image sensing portion 100 is recorded as the video signal on the magnetic tape 404.

A reading head HR reads the signal recorded on the magnetic tape 404 and applies the read signal to a reproducing amplifier 405.

Reproducing amplifier 405 amplifies the signal from the reading head HR and applies the amplified signal to a low pass filter 406 and a high pass filter 408.

Low pass filter 406 extracts the low frequency component of the signal output from reproducing amplifier 405, in other words extracts the low band converted chroma signal. The extracted low band converted chroma signal is applied to a high band converter 407.

High band converter 407 returns the frequency band of the low band converted chroma signal output from low pass filter 406 to the band it was in before the conversion by low band converter 402, and thus provides the original chroma signal C. The original chroma signal C is applied to a mixing amplifier 410.

High pass filter 408 extracts the high band component of the signal output from reproducing amplifier 405, in other words extracts the FM luminance signal, and applies the extracted FM luminance signal to an FM demodulator 409.

FM demodulator 409 demodulates the FM luminance signal from high pass filter 408 and provides the original luminance signal Y. The luminance signal Y is applied to mixing amplifier 410.

Mixing amplifier 410 mixes and amplifies the chroma signal C from high band converter 407 and the luminance signal Y from FM demodulator 409, and reproduces a video signal by which a video image can be reproduced on the picture plane of a TV receiver. The reproduced video signal is applied to the receiver through an output circuit 411.

The image sensed by image sensing portion 100 can therefore be provided in arbitrary time except for the time of sensing the image, by reproducing the video signal from the magnetic tape 404.

As in the foregoing, the conventional image sensing apparatus has only one optical system for taking up the optical image of an object (lenses 11 and iris 17, etc. in FIG. 7) and only one signal processing system (functional blocks succeeding image sensing device 12 in FIG. 7) for converting the optical image taken up into a video signal. It is therefore impossible for a single image sensing apparatus to reproduce an image on one picture plane using a plurality of video signal obtained by sensing the images of different objects at a time.

For example, in order to reproduce an image on one picture plane using two kinds of video signal obtained by sensing the images of two different kinds of objects at a time, two conventional image sensing apparatuses will be necessary. Furthermore, an additional circuit will be necessary for switching between or combining a video signal produced by one image sensing apparatus and a video signal produced by the other image sensing apparatus and applying the resultant signals to the receiver.

FIG. 9 is a block diagram schematically showing a structure which can readily be anticipated from such a point of view as a system for reproducing an image on one picture plane using two kinds of video signals obtained by sensing the images of different objects at a time. Referring to FIG. 9, this system includes two image sensing portions 100a and 100b having identical structures, an output circuit 4 for outputting a video signal to a receiver (not shown) and a switching circuit 3 for switching between the output signal of image sensing portion 100a and the output signal of image sensing portion 100b and applying the signal to output circuit 4.

Image sensing portions 100a and 100b each have an identical structure to a conventional image sensing apparatus shown in FIG. 7. In FIG. 9, in image sensing portion 100a, like functional blocks shown in FIG. 7 are designated by like numerals with the suffix "a" attached, while in image sensing portions 100b, like functional blocks shown in FIG. 7 are designated by like numerals with the suffix "b" attached. The operations of the functional blocks in image sensing portions 100a and 100b are the same as those in the case of the conventional image sensing apparatus shown in FIG. 7. A video signal corresponding to the optical image of the object captured by lenses 11a is therefore output from the adder 114a of image sensing portion 100a. Similarly, a video signal corresponding to the optical image of the object captured by lenses 11b is output from the adder 114b of image sensing portion 100b.

The video signal outputs from adders 114a and 114b are applied to output circuits 115a and 115b, respectively and also applied to switching circuit 3. Switching circuit 3 under the control of switching control circuit 5 selectively supplies either the video signal from adder 114a or the video signal from adder 114b to output circuit 4. Output circuit 4 externally outputs the video signal supplied from switching circuit 3.

In this system, a video signal output from either one of output circuits 4, 115a and 115b is applied to the receiver (not shown). If only the image of the object captured by lenses 11a is desired to be reproduced on the picture plane of the receiver, the output of the output circuit 115a is applied to the receiver. Similarly, if only the image of the object captured by lenses 11b is desired to be reproduced on the picture plane of the receiver, the output of output circuit 115b is applied to the receiver. If the image of the object captured by lenses 11a and the image of the object captured by lenses 11b are both desired to be reproduced on the picture plane of the receiver, the output signal of output circuit 4 is applied to the receiver.

Using switching circuit 3, it is possible, for example, to reproduce a combined image of the image of the object captured by lenses 11a and the image of the object captured by lenses 11b, or switch instantaneously the image displayed on the picture plane of the receiver from the object image captured by lenses 11a to the object image captured by lenses 11b or vice versa.

Switching control circuit 5, for example, generates a first signal which can control the internal connection state of switching circuit 3 so that switching circuit 3 applies a video signal from image sensing portion 100a to output circuit 4 and a second signal which can control the internal connection state of switching circuit 3 so that switching circuit 3 applies a video signal from image sensing portion 100b to output circuit 4. If the timing of switching a signal applied to switching circuit 3 from switching control circuit 5 from the first signal to the second signal and the timing of switching the signal from the second signal to the first signal can be somehow designated, an image produced by the image sensing of image sensing portion 100a and an image produced by the image sensing of the image sensing portion 100b can be displayed selectively or in combination on a single picture plane. When switching control circuit 5 continues to output the first signal and thus only the object image captured by lenses 11a is displayed on the entire picture plane of the receiver, the image on the entire picture plane can be switched to the image of the object captured by lenses 11b by switching the output signal of switching control circuit 5 to the second signal. Similarly, if switching control circuit 5 continues to output the second signal, and thus only the image of the object captured by lenses 11b is displayed on the entire picture plane, the image displayed on the picture plane can be instantaneously switched to the image of the object captured by lenses 11a by switching the output signal of switching control circuit 5 to the first signal. Furthermore, if the switching timing of the output signal of switching control circuit 5 is controlled so that the output signal of switching control circuit 5 is the first signal in the same prescribed period in any field period and the second signal in the other period, a part of the image of the object captured by lenses 11a and a part of the image of the object captured by lenses 11b are combined to be reproduced on a single picture plane.

FIG. 10 is a representation showing such an example of combination. Switching the output signal of switching control circuit 5 to the first signal (or the second signal) and the second signal (or the first signal) in the first half and second half of each field period, respectively allows the top half of the object image captured by lenses 11a (or 11b) and the bottom half of the object image captured by lenses 11b (or 11a) are combined and displayed. The switching timing of the output signal of switching control circuit 5 is controlled so that the output signal of switching control circuit 5 is the first signal (or the second signal) in a part of serial prescribed horizontal scanning periods in each field period, and is the second signal (or the first signal) in all the other horizontal scanning periods, and a combined image as shown in FIG. 4 is reproduced on the picture plane of the receiver. More specifically, the image of the object captured by lenses 11b (or 11a) is displayed on the entire picture plane with a part of the image replaced with a part of the object image captured by lenses 11a (or 11b).

Thus, using the conventional image sensing apparatus, the system which can process plural kinds of images produced by sensing the images of different objects at a time to be an image which can be displayed on the one picture plane requires optical systems and signal processing systems used for two conventional image sensing apparatuses. Such a system is on one hand highly functionable, processing a plurality of kinds of images produced by independent image sensing to be displayed on one picture plane, but on the other hand it is not practical in use because of the disadvantage in size reduction and cost reduction.

According to the conventional image sensing apparatus (see FIG. 7), it is not possible to instantaneously switch zoom magnifications, combine a plurality of object images which are sensed at different zoom magnifications and to expand the range of change of zoom magnifications too much.

Most of conventional image sensing apparatuses possess optical zoom function by which a remote object is sensed as if it is close by optically expanding the object. A general structure of lenses of an image sensing apparatus having such optical zoom function is shown in FIG. 11.

Referring to FIG. 11, the lenses generally includes a focus lens L1 for focusing an object, a zoom lens L2 for changing the focal distances of lenses, a main lens L3 for emitting light which have passed through focus lens L1 and zoom lens L1 upon the light receiving surface of the image sensing apparatus, which lenses are arranged in a optical axis X.

Focus lens L1 conducts focusing operation by its movement along the optical axis X.

The focal distances of lenses are continuously changed by the movement of zoom lens L2 along the optical axis. More specifically, the zoom magnification is determined uniformly depending upon the position of zoom lens L2 on the optical axis X. When image sensing is conducted under a constant zoom magnification, zoom lens L2 is fixed to a position from which a desired zoom magnification can be provided.

Therefore, for example, in FIG. 7, if lenses 11 include a zoom lens, the output signal of the adder 114 at the time of image sensing is a video signal obtained by sensing the image of the object at a prescribed zoom magnification.

If an object is image-sensed at a zoom magnification b ($\neq$a) after the object is initially image-sensed at a zoom magnification a, the zoom lens in lenses 11 is moved at a certain speed along the optical axis during the image sensing operation until the zoom magnification changes from a to b. At the time of image sensing operation as such, the output signal of adder 114 is not therefore switched instantaneously from a video signal corresponding to the object image sensed at the zoom magnification a to a video signal corresponding to the object image sensed at the zoom magnification b, but it becomes the video signal of the object image sensed at the zoom magnification b via the video signal of the object image sensed with the zoom magnification serially changed in the direction from a toward b. An image reproduced on the picture plane of the receiver by the output of output circuit 115 is therefore gradually switched from the object image magnified at the zoom magnification a to the object image magnified at the zoom magnification b.

In an image sensing apparatus having such optical zoom function, it will be necessary to use a lens with a large effective aperture diameter for the zoom lens for providing a high zoom magnification. The size of zoom lens should be increased in order to provide an image sensing apparatus having a high maximum zoom magnification. The image sensing apparatus having a high maximum zoom magnification which includes large-sized lenses 11 is therefore disadvantageous in terms of size reduction.

It is possible to implement instantaneous switching of zoom magnifications, and combining of the images of a plurality of objects sensed at different zoom magnifications by, for example, setting different values for the zoom magnification of lenses 11a and the zoom magnification of lenses 11b in the system having the structure shown in FIG. 9, but the system is encountered with the above-stated problems.

Furthermore, a conventional camcorder (see FIG. 8) includes single image sensing portion 100 which has only one signal processing system for converting the taken optical image into a video signal and only one optical system for taking up the optical image of an object, and a recording portion 400 for recording video signals Y and C produced at image sensing portion 100 on a magnetic tape. The conventional camcorder therefore can only record and reproduce the image of an object captured by one system of lenses. More specifically, the conventional camcorder cannot record a plurality of object images captured by a plurality of lens systems, or reproduce selectively these plurality of object images. In other words, the conventional image sensing apparatus with recording function cannot achieve various image sensing operations and various reproduction operations.

A construction of image sensing portion 100 as shown in FIG. 9 may be considered as one method of solving such a problem. However, such a method is still encountered with disadvantage in size reduction and cost reduction of the apparatus as stated above.

SUMMARY OF THE INVENTION

It is an object of the present invention to provide an image sensing apparatus having a function of processing a plurality of picture images which can reproduce on one picture plane a plurality of object images captured by a plurality of lenses selectively or in combination.

Another object of the present invention is to implement a function of processing a plurality of picture images without impeding size reduction as well as cost reduction of an image sensing apparatus.

Yet another object of the present invention is to provide an image sensing apparatus with recording function which has a function of recording/reproducing a plurality of picture images by which a plurality of object images captured by a plurality of lenses can be recorded and reproduced.

A still further object of the present invention is to provide a plurality of picture images recording/reproducing function without impeding cost reduction as well as size reduction of an image sensing apparatus with recording function.

A still further object of the present invention is to provide an image sensing apparatus which allows sensing of the image of an object at a high zoom magnification.

A still further object of the present invention is to enable image sensing at a high zoom magnification without increasing the size of an image-sensing apparatus.

A still further object of the present invention is to solve the above-stated problems and provide an image sensing apparatus advantageous for size reduction as well as cost reduction, which provides plural picture images processing function allowing reproduction of a plurality of object images captured by a plurality of lenses on one picture plane either selectively or in combination, a plural picture images recording/reproducing function allowing recording and reproduction of these plurality of object images, and a function of image sensing an object at a high zoom magnification.

An image sensing apparatus in accordance with present invention in a first aspect includes a first optical system for taking up first external light forming the optical image of a first object, a second optical system for taking up second external light forming the optical image of a second object, a first conversion circuit for converting the optical image of the first object formed by the first external light taken up by the first optical system into a first electrical signal, a second conversion circuit for converting the optical image of the second object formed by the second external light taken up by the second optical system into a second electrical signal, a selection circuit for selecting either one of the first electrical signal converted by the first conversion circuit and the second electrical signal converted by the second conversion circuit, and a video signal producing circuit for producing a video signal based on the electrical signal selected by the selection circuit.

Preferably, the first conversion circuit includes a first generation circuit for generating an electrical signal at a level in accordance with the intensity of the first external light taken up by the first optical system, and a level control circuit for controlling the level of the electrical signal generated by the first generation circuit at a prescribed level, while the second conversion circuit includes a second generation circuit for generating an electrical signal at a level in accordance with the intensity of the second external light taken up by the second optical system, and second level control circuit for controlling the level of the electrical signal generated by the second generation circuit at a level equal to the prescribed level.

More preferably, the first optical system includes a first lens for emitting the first external light upon the first generation circuit, and a first incident light amount control circuit for controlling the amount of incident light upon the first generation circuit from the first lens at a prescribed amount, while the second optical system includes a second lens for emitting the second external light upon the second generation circuit, and a second incident light amount control circuit for controlling the amount of incident light to the second generation circuit at an amount equal to the prescribed amount.

If the first electrical signal includes color signal components indicating color information on the first object, and the second electrical signal includes color signal component indicating color information on the second object, the video signal producing circuit preferably includes an extraction circuit for extracting the color signal components from the selected electrical signal, and white balance adjustment circuit for controlling the gains of the extracted color signal components for the purpose of adjusting white balance.

The white balance adjustment circuit conducts different gain control to extract color signal components between the time when the selected electrical signal is the first electrical signal and the time when the selected electrical signal is the second electrical signal. The white balance adjustment circuit preferably controls the gains of the extracted color signal components based on a first value predetermined in accordance with the optical characteristics of the first optical system and the first conversion circuit if the selected electrical signal is the first electrical signal. If the selected electrical signal is the second electrical signal, it controls the gains of the extracted color signal components based on a second value predetermined in accordance with the optical characteristics of the second optical system and second conversion circuit.

In accordance with a second aspect, in the image sensing apparatus according to the first aspect, the first optical system includes a first lens with a variable focal distance, the second optical system includes a second lens with a variable focal distance, and the minimum value of the focal distance of the first lens is set equal to the maximum value of the focal distance of the second lens. In this aspect, the image sensing apparatus according to the present invention further includes a first detection circuit for detecting that the focal distance of the first lens becomes minimum when the first electrical signal is selected by the selection circuit, and a first selection control circuit for causing the selection circuit to select the second electrical signal in response to the detection output of the first detection circuit, a second detection circuit for detecting that the focal distance of the second lens becomes maximum when the second electrical signal is selected by the selection circuit, and a second selection control circuit for causing the selection circuit to select the first electrical signal in response to the detection output of the second detection circuit.

According to a third aspect, the image sensing apparatus in accordance with the present invention includes a first optical system for taking up first external light forming the optical image of a first object, a second optical system for taking up second external light forming the optical image of a second object, a first conversion circuit for converting the optical image of the first object formed by the first external light taken up by the first optical system into a first electrical signal, a second conversion circuit for converting the optical image formed by the second external light taken up by the second optical system into a second electrical signal, an electrical signal selection circuit for alternately selecting the first electrical signal converted by the first conversion circuit and the second electrical signal converted by the second conversion circuit for every 1 field, and video signal producing circuit for producing a video signal based on the electrical signal selected by the electrical signal selection circuit. The image sensing apparatus further includes a recording circuit for recording the video signal produced by the video signal producing circuit on a recording medium, a reproduction circuit for reproducing the video signal from the recording medium, a delay circuit for delaying the video signal reproduced by the reproduction circuit for a time period corresponding to 1 field period, and a switching circuit for alternately switching between the video signal delayed by the delay circuit and the video signal reproduced by the reproduction circuit for every 1 field period for output.

Preferably, the image sensing apparatus further includes first and second switching timing control circuits for controlling the switching timing by the switching circuit.

The first switching timing control circuit controls the switching timing by the switching circuit so that the reproduced video signal is output from the switching circuit during the period when the reproduced video signal is a video signal produced based on the first electrical signal, while the delay video signal is output from the switching means during the other periods. A second switching timing control circuit controls the switching timing by the switching circuit so that the reproduced video signal is output from the switching circuit during the period when the reproduced video signal is a video signal produced based on the second electrical signal, and the delayed video signal is output from the switching circuit during the other periods.

According to a fourth aspect, a method of operating an image sensing apparatus in accordance with the present invention is a method of operating an image sensing apparatus including a first optical system for taking up first external light forming the optical image of a first object, and a second optical system for taking up second external light for forming the optical image of a second object, and includes the steps of converting the optical image formed by the taken up first external light into a first electrical signal, converting the optical image formed by the taken up second external light into a second electrical signal, selecting either one of the converted first electrical signal and the converted second electrical signal, and producing a video signal based on the selected electrical signal.

According to the first aspect, the image sensing apparatus in accordance with the present invention even though having independently the first optical system and the second optical system, respectively, for taking up the optical image of the first object and for taking up the optical image of the second object, includes a circuit for producing a video signal corresponding to the optical image of a first object and a circuit for producing a video signal corresponding to the optical image of the second object as a common video signal producing circuit. The electrical signal to be applied to the video signal producing circuit is selected by the selection circuit between the electrical signal obtained from the optical image of the first object and the electrical signal obtained from the optical image of the second object. The video signal produced by this video signal producing circuit will therefore correspond to the first object or the second object depending upon the electrical signal selected by the selection circuit. More specifically, the video signal produced by the video signal producing circuit as is the case with the output signal of output circuit 4 in the system shown in FIG. 10, makes it possible to reproduce the first and second object images by switching them or combining them on one picture plane.

Preferably, the first conversion circuit and second conversion circuit are provided with first and second level control circuits, respectively, and more specifically the first and second optical system are provided with first and second incident light amount control circuits, respectively, thus forcing the level of the first electrical signal to be equal to the level of the second electrical signal.

If the first electrical signal includes color signal components indicating color information on the first object, and the second electrical signal includes color signal components indicating color information on the second object, preferably the white balance adjustment circuit included in the video signal producing circuit conducts different gain controls to the color signal components extracted from the selected electrical signal as a function of whether the first electrical signal or the second electrical signal is selected by the selection circuit. The color signal components included in the first electrical signal and the color signal components included in the second electrical signal are both subjected to appropriate white balance adjustments.

According to the second aspect, the image sensing apparatus in accordance with the present invention has an optical system each having a lens with a variable focal distance, with the minimum value of the focal distance of the lens of the first optical system being set equal to the maximum value of the focal distance of the lens of the second optical system, and includes first and second detection circuits and first and second selection control circuits as described above. Therefore, when image sensing by the first optical system is conducted while reducing its focal distance, the output signal of the video signal producing circuit is a video signal corresponding to the object image captured by the first optical system until the focal distance of the lens of the first optical system reaches its minimum value, and is switched to a video signal corresponding to the object image captured by the second optical system after the focal distance reaches its minimum value by the operations of first detection circuit and first selection control circuit. If image sensing by second optical system is conducted while increasing the focal distance of the second optical system, the output signal of the video signal producing circuit is a video signal corresponding to the object image captured by the second optical system until the focal distance of the lens of the second optical system reaches its maximum value and is switched to a video signal corresponding to the optical image captured by the first optical system by the functions of the second detection circuit and second selection control circuit.

According to the third aspect, the image sensing apparatus in accordance with the present invention includes a recording circuit and a reproduction circuit for implementing its recording and reproducing functions, and its electrical signal selection circuit alternately selects the first electrical signal and second electrical signal for every 1 field. Therefore, to the recording medium, the video signal produced based on the first electrical signal and the video signal produced based on the second electrical signal are alternately recorded for every 1 field period and thus the video signal produced based on the first electrical signal and the electrical signal produced based on the second electrical signal are alternately reproduced by 1 field period. The image sensing apparatus in accordance with this aspect is structured to output the video signal obtained by delaying the video signal reproduced by the reproduction circuit by a time period corresponding to 1 field period and the not delayed video signal by alternately switching them for every 1 field. Therefore at the time of reproduction, among the video signals recorded on the recording medium, each field signal of the video signal produced based on the first-electrical signal (in the case of the first switching timing control circuit operating) or the video signal produced based on the second electrical signal (in the case of the second switching timing control circuit operating) is joined by twos.

According to the fourth aspect, the method of operating the image sensing apparatus in accordance with the present invention includes the step of producing a video signal after the step of selecting either one of the first electrical signal obtained from the object image captured by the first optical system and the second electrical signal obtained from the object image captured by the second optical system. Therefore, a circuit for implementing the step of producing a video signal does not have to be independently provided each for the first electrical signal and second electrical signal. Therefore, according to the present invention, an image sensing apparatus having a function of reproducing a plurality of kinds of object images captured by a plurality of optical systems on the same picture plane by switching them or combining them, an image sensing apparatus with recording function having a function of recording a plurality of kinds of object images such as these on a recording medium and then selectively reproducing those images from the recording medium, etc. can be implemented using a single video signal producing circuit. Furthermore, according to the present invention, an image sensing apparatus whose maximum zoom magnification is far higher than conventional ones can be provided without increasing the size of the apparatus. More specifically, image sensing effects and zoom magnifications higher than those provided by conventional image sensing apparatuses as well as reproducing effects higher than conventional image sensing apparatuses with recording function can be implemented in a structure advantageous for cost reduction and size reduction of the apparatus.

The foregoing and other objects, features, aspects and advantages of the present invention will become more apparent from the following detailed description of the present invention given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
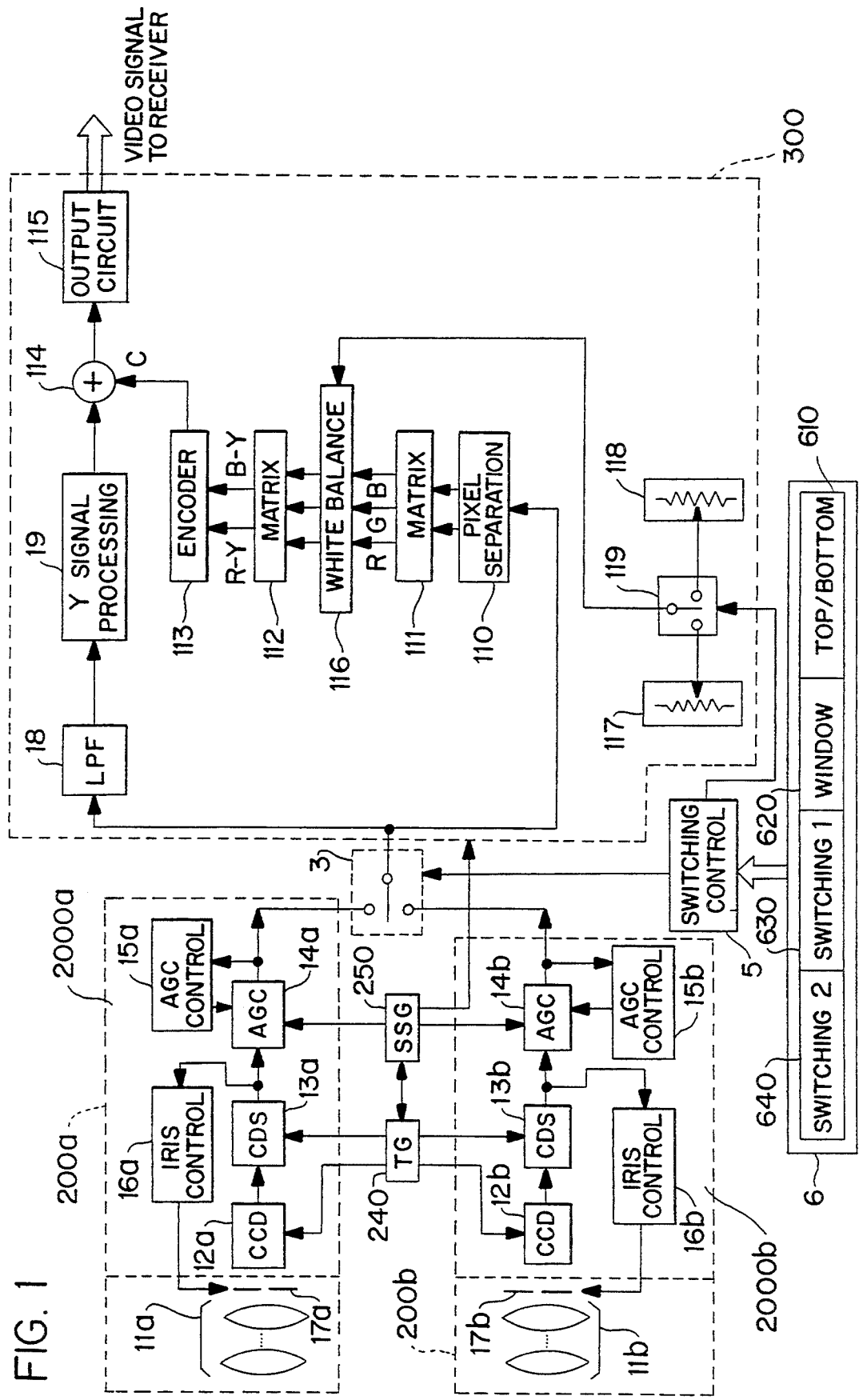
FIG. 1 is a block diagram showing the entire structure of an image sensing apparatus with two-picture image processing function in accordance with one embodiment of the present invention.

FIG. 1 is a block diagram showing the entire structure of an image sensing apparatus with two-picture images processing function in accordance with one embodiment of the present invention.

Referring to FIG. 1, the image sensing apparatus with two-picture image processing function includes two conversion portions 200a and 200b having an identical structure, a single video signal producing portion 300, a switching circuit 3 provided between conversion portions 200a and 200b and video signal producing portion 300, and a switching control circuit 5 which controls the respective internal connection states of switching circuit 3 and a white balance switching circuit 119.

Figure 7:
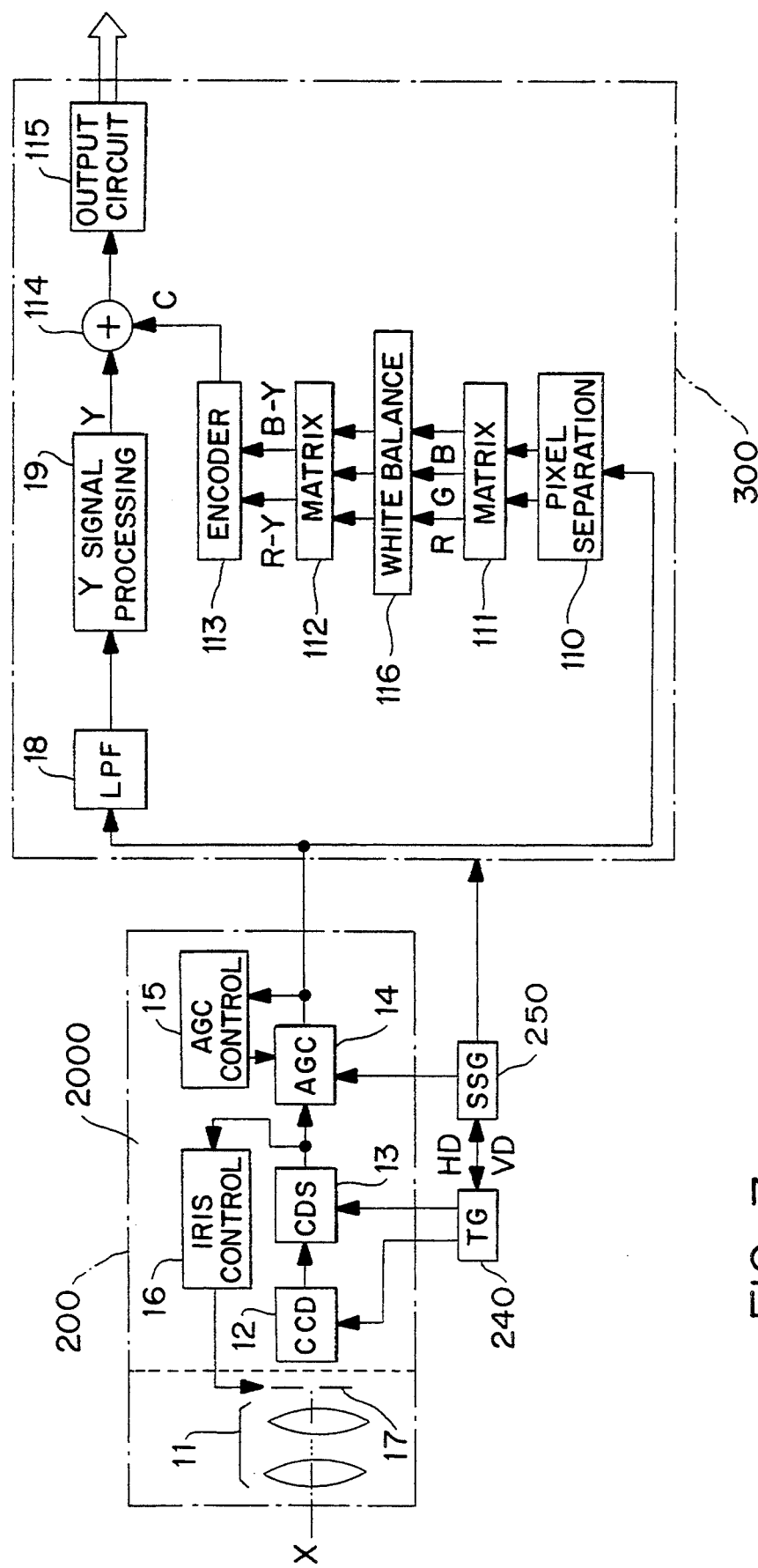
FIG. 7 is a block diagram schematically showing the entire structure of a conventional video camera.

Conversion portions 200a and 200b each has an identical structure to conversion portion 200 in the conventional image sensing apparatus shown in FIG. 7. In FIG. 1, functional blocks in conversion portion 200a are denoted with the same numerals as corresponding functional blocks in conversion portion 200 in FIG. 7 together with the suffix "a", while functional blocks in conversion portion 200b are denoted with the same numerals as corresponding functional blocks in conversion portion 200 in FIG. 7 together with the suffix "b". The operations of the functional blocks in conversion portions 200a and 200b are the same as those shown in FIG. 7, and, therefore, a description thereof will not be repeated.

Iris control circuits 16a and 16b and AGC control circuits 15a and 15b are designed so that the level of an electrical signal having its level controlled by iris 17a and AGC amplifier 14a and the level of an electrical signal having its level controlled by iris 17b and AGC amplifier 14b are equal to each other. Thus, when the image of an object captured by lenses 11a and the image of an object captured by lenses 11b are reproduced on the same picture plane or reproduced switched instantaneously between each other, difficulty in viewing due to the difference in brightness between those two images can be avoided.

Video signal producing portion 300 in this image sensing apparatus, in addition to the internal circuitry of video signal producing portions 300 in the conventional image sensing apparatus shown in FIG. 7, includes a white balance switching circuit 119, and white balance control value setting circuits 117 and 118. Except for the structures and the operations of white balance control value setting circuits 117 and 118 and white balance switching circuit 119, white balance circuit 116, the structures and operations of the other parts of video signal producing portions 300 are identical to the conventional one, and, therefore, a description thereof will not be repeated.

In FIG. 7, which value the average level of each of the color difference signals R - Y and B - Y for one picture plane should be controlled to be, in order to makes the color of an image reproduced by the output signal of output circuit 115 as near to the color captured by human eyes as possible, depends on the spectroscopic characteristics of lenses 11 and image sensing device 12. More specifically, the gains of primary color signals R, G and B are controlled by white balance circuit 116 so that the average levels of each of the color difference signals R - Y and B - Y for one picture plane take the value which allows the images of an object captured by lenses 11 and image sensing device 12 to be reproduced on the picture plane of the receiver with the color closest to the color viewed by human eyes (hereinafter referred to such a value as a white balance control value).

It is noted that in the present embodiment, the spectroscopic characteristics of lenses 11a and image sensing device 12a are different from the spectroscopic characteristics of lenses 11b and image sensing device 12b.

White balance control value setting circuit 117 generates a white balance control value predetermined in accordance with the spectroscopic characteristics of lenses 11a and image sensing device 12a so that the image of an object captured by lenses 11a is reproduced on the picture plane of the receiver with the color closest to the color viewed by human eyes. Meanwhile, white balance control value setting circuit 118 generates a white balance control value predetermined in accordance with the spectroscopic characteristics of lenses 11b and image sensing device 12b so that the image of the object captured by lenses 11b is reproduced on the picture plane of the receiver with the color closest to the color viewed by human eyes.

White balance switching circuit 119 under the control of switching control circuit 5 applies either of the white balance control value generated by white balance control value setting circuit 117 and the white balance control value generated by white balance control value setting circuit 118 to white balance circuit 116.

White balance switching circuit 119 is controlled by switching control circuit 5 to operate in relation with switching circuit 3.

More specifically, switching control circuit 5 controls the internal connection state of white balance control switching circuit 119 so that the white balance control value generated by white balance control value setting circuit 117 is applied to white balance circuit 116 when the output signal of conversion portion 200a is supplied to video signal producing portion 300, and the white balance control value generated by the white balance control value setting circuit 118 is applied to white balance circuit 116 when the output signal of conversion portion 200b is applied to video signal producing portion 300.

White balance circuit 116 controls the gains of the primary color signals R, G and B from matrix circuit 111 so that the white balance control value from white balance control switching circuit 119 matches the average level of each of the color difference signals R - Y and B - Y for one picture plane.

White balance circuit 116 therefore controls the gains of primary color signals R, G and B based on the white balance control value suitable for the spectroscopic characteristics of lenses 11a and image sensing device 12a during the period when the electrical signal corresponding to the image of the object captured by lenses 11a is supplied to video signal producing portion 300, and based on the white balance control value suitable for the spectroscopic characteristics of lenses 11b and image sensing device 12b during the period when the electrical signal corresponding to the image of the object captured by lenses 11b is supplied to video signal producing portion 300. Consequently, a white-balanced chroma signal C is produced in video signal producing portion 300 from any one of the output signals of conversion portions 200a and 200b.

If the white balance control value cannot be switched as stated above, in other words if white balance circuit 116 controls the gains of the primary color signals R, G and B based on the same white balance control value to both of the electrical signals from conversion portions 200a and 200b, the difference between the color reproduced by the chroma signal C produced from the output signal of the conversion portion 200a and the actual color will be different from the difference between the color reproduced by the chroma signal C produced from the output signal of conversion portion 200b and the actual color, due to the difference between the spectroscopic characteristics of lenses 11a and image sensing device 12a and the spectroscopics characteristics of lenses 11b and image sensing device 12b. If the white balance control value is fixed to the one suitable for the spectroscopic characteristics of lenses 11a and image sensing device 12a (or lenses 11b and image sensing device 12b), an white-in balanced image is reproduced by the chroma signal C produced from the output signal of conversion portion 200b (or 200a). As a result, it will be impossible to reproduce the object image captured by lenses 11a and the object image captured by lenses 11b as a white-balanced image.

Switching circuit 3 is controlled by switching control circuit 5 to apply selectively either one of an electrical signal having its level controlled by AGC circuit 14a and an electrical signal having its level controlled by AGC amplifier 14b. Switching control circuit 5 in response to the output signal of an external switch 6, outputs a first signal by which the internal connection state of switching circuit 3 can be controlled so that the switching circuit 3 applies the output signal of AGC amplifier 14a to video signal producing portion 300, or a second signal by which the internal connection state of switching circuit 3 can be controlled so that switching circuit 3 applies the output signal of AGC amplifier 14b to video signal producing portion 300.

External switch 6 includes, for example, an operation key 610 for selecting a mode to instruct switching control circuit 5 to output the first signal and second signal (or the second signal and first signal) in the first half and second half of each field period, respectively, an operation key 620 for selecting a-mode to instruct switching control circuit 5 to output the first signal (or second signal) in a part of serial prescribed horizontal scanning periods in each field period and output the second signal (or the first signal) in all the other periods, an operation key 630 for selecting a mode to instruct switching control circuit 5 to output only the first signal in all the field periods, and an operation key 640 for selecting a mode to instruct switching control circuit 5 to output only the second signal in all the field periods.

Figure 10A:
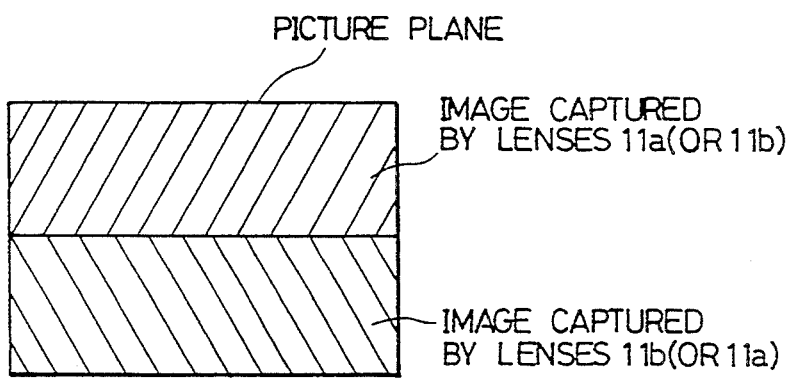
FIG. 10 is a diagram showing a picture plane structure which can be implemented by the image sensing apparatus with two-picture plane processing function in accordance with the present invention and the system shown in FIG. 9.
Figure 10B:
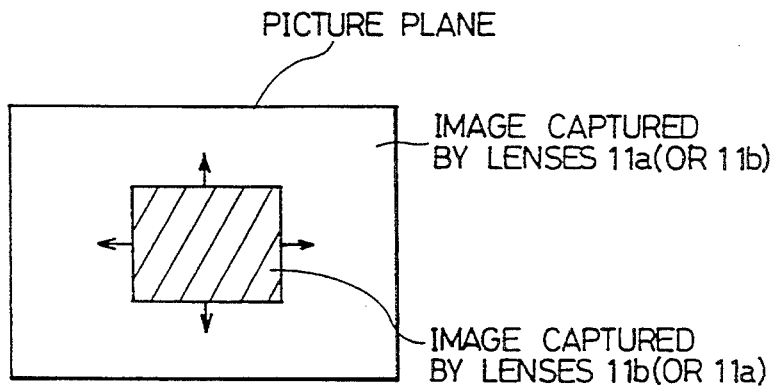
Figure 11:
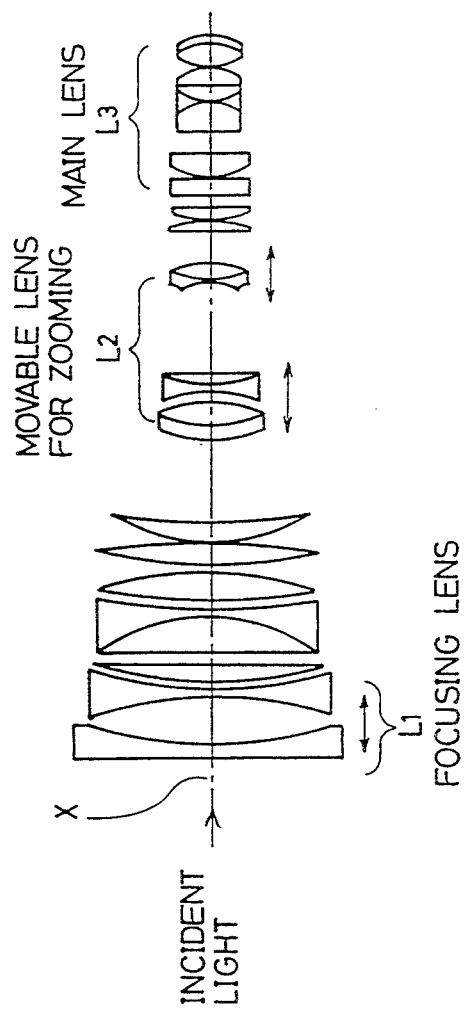
FIG. 11 is a representation showing a general structure of lenses of an image sensing apparatus with zoom function.

By operation key 610, the first and second halves of the video signal of each field output from output circuit 115 correspond to the optical images captured by different lenses 11a and 11b, respectively. Therefore in this case, as shown in FIG. 10(a), the top half of either one of the object images captured by lenses 11a and 11b and the bottom half of the other object image are reproduced in combination. By operation key 620, the video signal of each field output from output circuit 115 corresponds to the object image captured by lenses 11a (or the object image captured by lenses 11b) in, only a part of serial prescribed horizontal scanning periods and corresponds to the object image captured by lenses (or the object image captured by lenses 11a) in all the other periods. Therefore, as shown in FIG. 10 (b) a part of one object image of the object image captured by lenses 11a and the object image captured by lenses 11b is reproduced on the other object image like a window on the picture plane of the receiver by the video signal from output circuit 115. By operation key 630, the video signals of all the fields output by output circuit 115 correspond to the object image captured by lenses 11a. In this case, only the object image captured by lenses 11a is reproduced on the entire picture plane of the receiver. Conversely, by operation key 640, the video signals of all fields output by output circuit 115 correspond to the object image captured by lenses 11b. Therefore, only the object image captured by lenses 11b is reproduced on the picture plane of the receiver. Switching between operation keys 630 and 640 makes it possible to instantaneously switch the image on the picture plane from the object image captured by lenses 11a to the object image captured by lenses 11b or vice versa.

Figure 9:
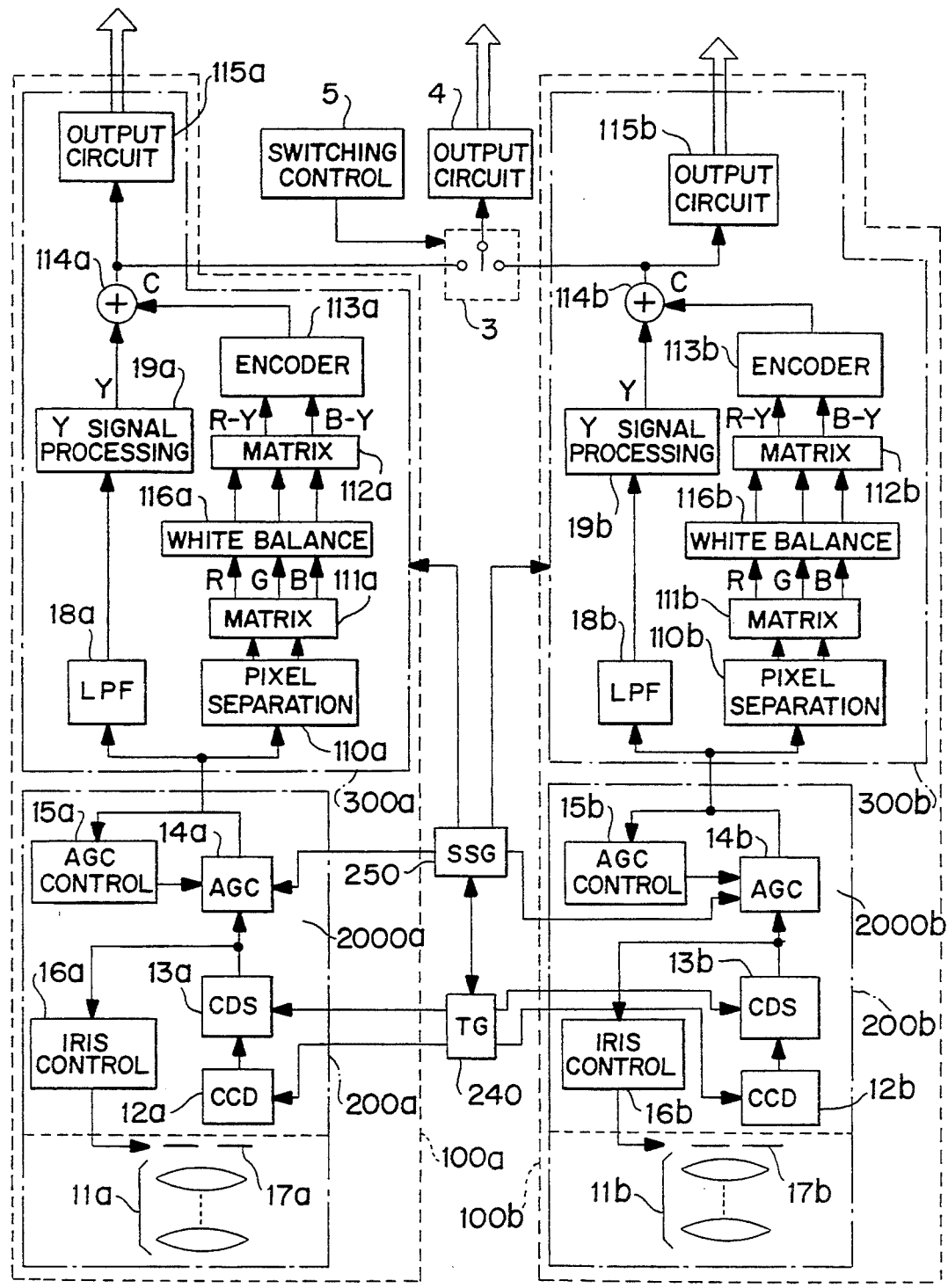
FIG. 9 is a block diagram schematically showing the structure of a system which implements two-picture plane processing function using into conventional image sensing apparatuses.

As in the foregoing, according to the image sensing apparatus with two-picture image processing function, the image captured by conversion portion 200a and the image captured by conversion portion 200b are switched or combined to be reproduced on one picture plane. Thus, the function implemented by the system shown in FIG. 9 can be implemented in a structure with a small circuit scale advantageous for cost reduction as well as size reduction.

Conversion portions 200a and 200b are provided as independent units each electrically connected to switching circuit 3. The unit formed as conversion portion 200a and the unit formed as conversion portion 200b are structured physically movable independently from each other. The user can therefore independently select between the object image captured by lenses 11a and the object image captured by lenses 11b.

Although in the above-stated embodiments, the images which can be reproduced on one picture plane are the object image captured by two optical systems, the object images can be captured by three or more optical systems. In this case, additional conversion portions each having an identical structure to each conversion portion 200a, 200b are provided, and a switch circuit for switching between the output signals of these conversion portions and applying one of the signals to video signal producing portion 300 may be provided between these conversion portions and video signal producing portion 300.

Figure 2:
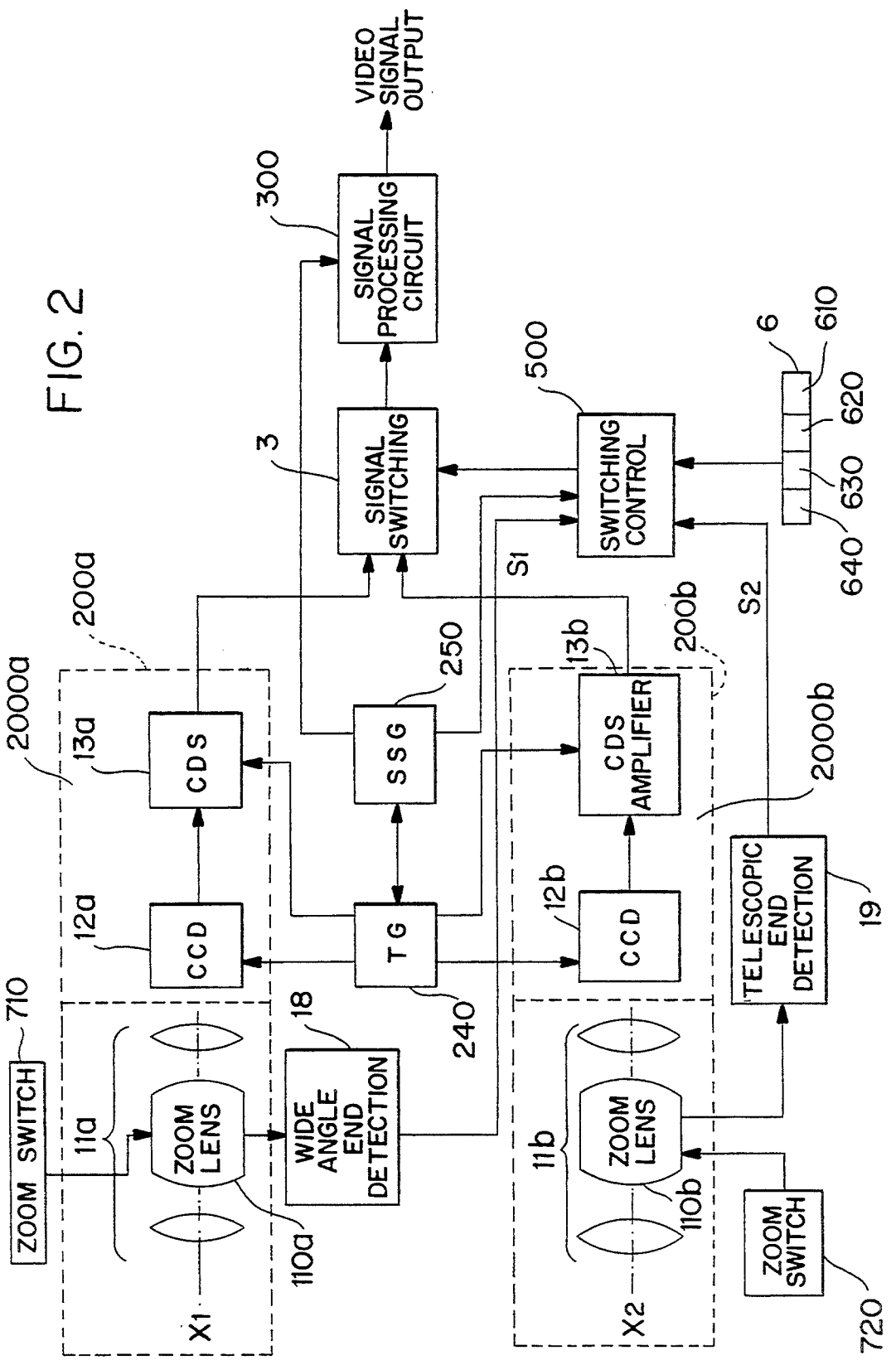
FIG. 2 is a block diagram showing the basic entire structure of a high zoom magnification image sensing apparatus in accordance with another embodiment of the present invention.

FIG. 2 is a block diagram schematically showing the basic entire structure of a high zoom magnification image sensing apparatus in accordance with another embodiment of the present invention.

Referring to FIG. 2, the image sensing apparatus includes two conversion portions 200a and 200b, a signal switching circuit 3 and a switching control circuit 5 for selecting either one of the output signals of conversion portions 200a and 200b, a signal processing portion 300 for producing a video signal of a prescribed form based on the selected output signal, an external switch 710 for changing the zoom magnification of conversion portion 200a, an external switch 720 for changing the zoom magnification of conversion portion 200b, a wide angle end detection portion 18 for detecting that the zoom magnification of conversion portion 200a is minimum, and a telescopic end detection portion 19 for detecting that the zoom magnification of conversion portion 200b is maximum.

In the present embodiment, lenses 11a and 11b include zoom lenses 110a and 110b, respectively. The movement of zoom lens 110a along the optical axis X1 of lenses 11a by the control of external switch 710 changes the focal distance of lenses 11a. An object can therefore be image-sensed by conversion portion 200a with the zoom magnification being changed.

Similarly, the movement of zoom lens 110b along the optical axis X of lenses 11b by the control of external switch 720 serially changes the focal distance of lenses 11b. An object can be image-sensed by conversion portion 200b with the zoom magnification being changed.

Figure 3:
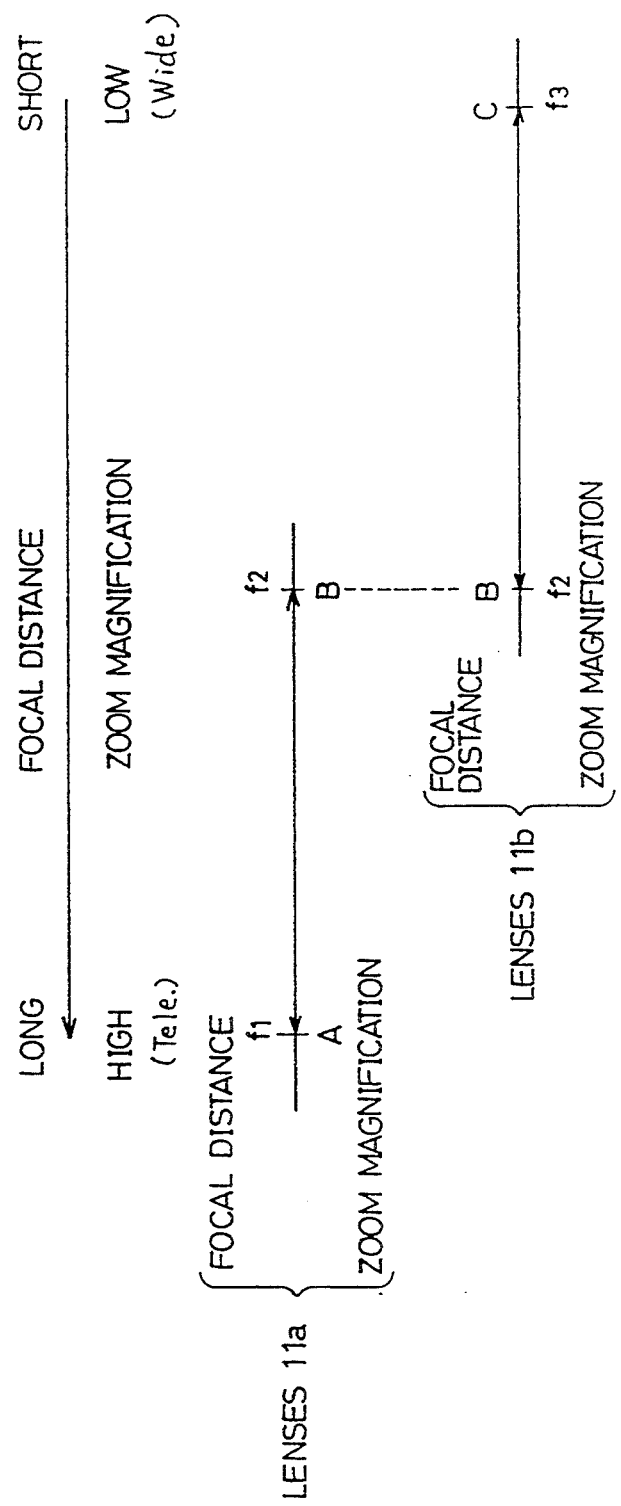
FIG. 3 is a representation showing the range of zoom magnification change by each of lenses 11a and 11b in FIG. 2.

FIG. 3 is a representation showing the relation between the range of change of the focal distance of lenses 11a and the range of change of the focal distance of lenses 11b.

Now referring to FIGS. 2 and 3, the focal distance of lenses 11a can be changed from maximum f1 to minimum f2 by moving zoom lens 110a along the optical axis X1. Meanwhile the focal distance of lenses 11b can be changed from maximum f2 to minimum f3 by moving zoom lens 110b along the optical axis X2. Thus, the minimum focal distance of lenses 11a is set to be equal to the maximum focal distance of lenses 11b.

The shorter the focal distance of lenses is, at the lower zoom lens magnification an object can be captured by the lenses. Therefore, when the focal distance of lenses 11a is f1 and f2, the zoom magnification of conversion portion 200a becomes maximum and minimum, respectively. When the focal distance of lenses 11b is f2 and f3, the zoom magnifications of conversion portion 200b becomes maximum and minimum, respectively.

The position of the zoom lens on the optical axis where the zoom magnification is maximum is called telescopic end, while the position of the zoom lens on the optical axis where the zoom magnification becomes minimum is called wide angle end.

Referring to FIG. 2, the operations of lenses 11a and 11b, image sensing devices 11a and 11b, CDS circuits 13a and 13b, and timing generator 240 and synchronizing signal generator 250 are substantially identical to those in the above-stated embodiments. Description therefore will not be repeated thereon. Signal processing circuit 300 can also have an identical structure to, for example, video signal producing portion 300 in FIG. 1.

Switching control circuit 5 switches a signal to be supplied to signal processing circuit 300 not only in response to key input of an external switch 6a as is the case with the above-described embodiment, but also in response to the output of wide angle end detection portion 18 and the output of telescopic end detection circuit 19.

External switch 6 is formed, for example, similarly as the case in the above-stated embodiment (see FIG. 1). Thus, also in the present embodiment, the object image captured by lenses 11a and the object image captured by lenses 11b can instantaneously be switched or combined to be reproduced on picture plane.

Therefore, when the zoom magnification of conversion portion 200a and the zoom magnification of conversion portion 200b are set to be different values operating external switches 710 and 720, an object image can be reproduced on one picture plane at different zoom magnifications, or reproduced with the zoom magnification instantaneously switched, by operating external switch 6.

Wide angle end detection portions 18 detects a serial movement of zoom lens 110 a to the wide angle end at the time of image sensing by optical system 11a, and applies a detection signal S1 to switching control circuit 5 in response to the detection.

Telescopic end detection portion 19 detects a serial movement of zoom lens 110b to the telescopic end at the time of sensing by optical system 11b, and applies a detection signal S2 indicating the detection to switching control circuit 5.

Switching control circuit 5, in response to the signal S1, controls signal switching circuit 3 so that the output signal of conversion portion 200b is applied to signal processing circuit 300 regardless of a key input to external switch 6, while, in response to the signal S2, controls signal switching circuit 3 so that the output signal of conversion portion 200a is applied to signal processing circuit 300 regardless of a key input to external switch 6.

Therefore, if the user initially applies the output signal of conversion portion 200b to signal processing circuit 300 using operation key 640 and takes the object with lenses 11b while serially increasing the zoom magnification by operating external switch 720, the signal to be applied to signal processing circuit 300 is switched to the output signal of conversion portion 200a at the time when the zoom magnification of lenses 11b reaches its maximum. Then, if the user thereafter takes the same object with lenses 11a while increasing the zoom magnification of lenses 11a by operating external switch 710, the signal output from signal processing circuit 300 is switched to the one corresponding to the object image sensed at the zoom magnification of lenses 11a.

More specifically, if the zoom magnification of lenses 11a is gradually increased right after the zoom magnification of lenses 11b is changed to its maximum, the object image expanded at the maximum zoom magnification by lenses 11b is reproduced on the picture plane of the receiver and then the object image expanded at the minimum zoom magnification of lenses 11a which is higher than the minimum zoom magnification of lenses 11b.

Conversely, when the user initially image-senses an object with lenses 11a by applying the output signal of conversion portion 200a to signal processing circuit 300 using operation key 630 while decreasing the zoom magnification, operating the external switch 710, the signal applied to signal processing circuit 300 is switched to the output signal of conversion portion 200b at the time when the zoom magnification by lens 11a becomes minimum. If then the user operates external switch 720 thus decreasing the zoom magnification and image-senses the same object with lenses 11b, the video signal of the object image produced at a lower zoom magnification than before is output from signal processing circuit 300.

More specifically, if the user continues to decrease the zoom magnification of lenses 11b right after changing the zoom magnification of lenses 11a to the minimum, the object image reduced at the minimum magnification of lenses 11a is reproduced on the picture plane of a receiver (not shown) and then the object image reduced at the minimum magnification of lense 11b which is lower than the minimum magnification of lense 11a is reproduced.

According to the present embodiment, an object can be image-sensed while changing the zoom magnification in a very wide range corresponding to the sum of the change range of the zoom magnification (A-B) possible by one zoom lens 110a and the change range of the zoom magnification (B-C) by the other zoom lens 110b. It is therefore possible to take an object at a greatly higher zoom magnification compared to conversional ones, without increasing the sizes of zoom lenses 110a and 110b.

Figure 4:
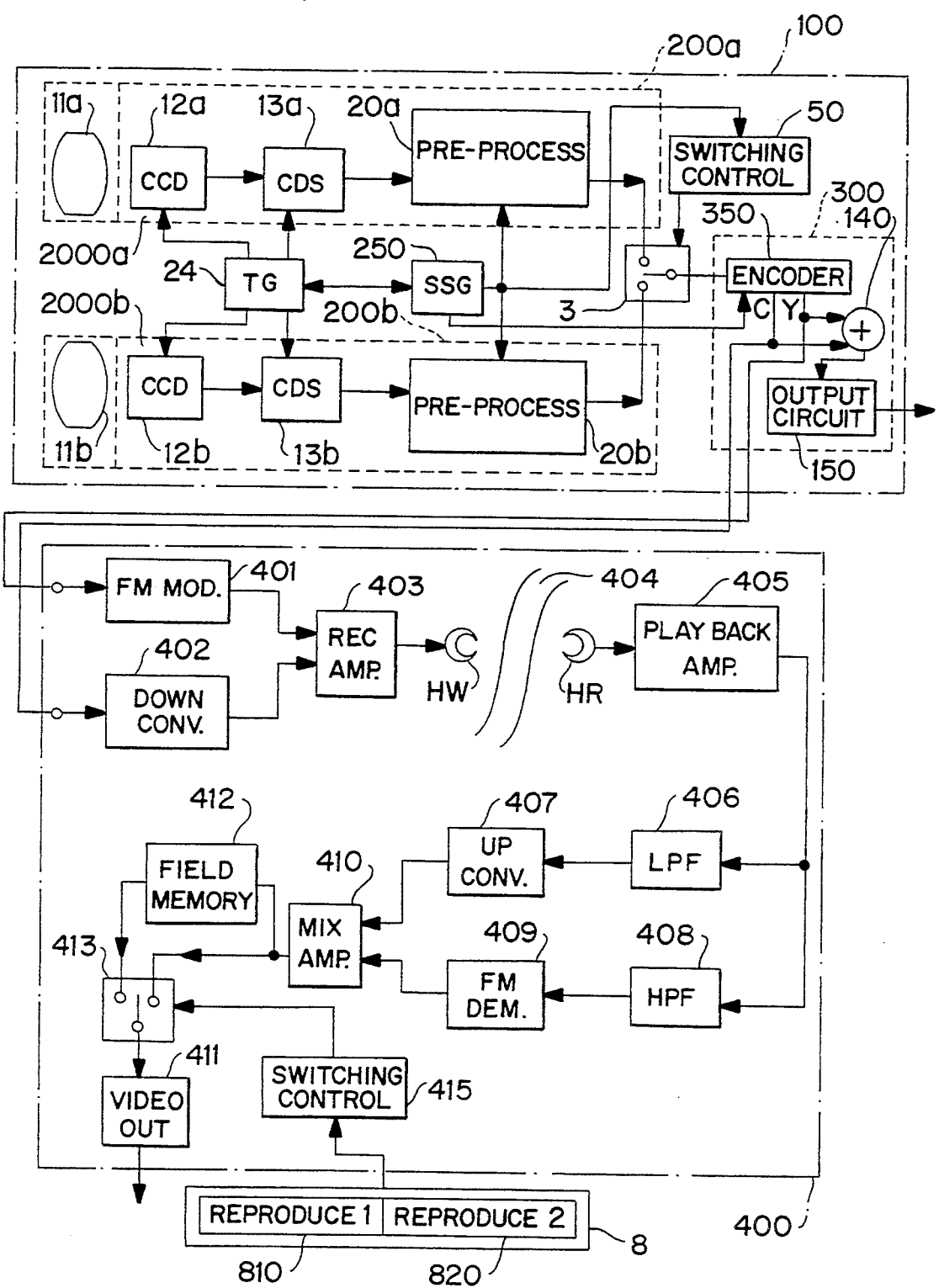
FIG. 4 is a block diagram schematically showing the entire structure of a camcorder in accordance with yet another embodiment of the present invention.

FIG. 4 is a block diagram schematically showing the basic entire structure of a camcorder in accordance with another embodiment of the present invention.

Referring to FIG. 4, the camcorder includes an image sensing portion 100 basically having the structure shown in FIG. 1, and a recording portion 400 provided with a field memory 412.

Image sensing portion 100 includes two conversion portions 200a and 200b, a switching circuit 3 and a switching control circuit 50 for selecting either one of the output signals of conversion portions 200a and 200b, and a video signal producing portion 300 for producing a video signal including a luminance signal Y and a chroma signal C, in response to the signal selected by switching circuit 3.

The operations of lenses 11a and 11b, image sensing devices 12a and 12b, CDS circuits 13a and 13b, and a timing generator 240 and a synchronizing signal generator 250 are substantially identical to those in the above-stated embodiments, and, therefore, a description will not be repeated.

A preprocessing circuit 20a conducts to an electrical signal from CDS circuit 13a, for example, various correction processing and other processings, which processings are included in processing to be conducted prior to input to video signal producing portion 300, such as gain control processing as conducted by AGC amplifier 14a and AGC control circuit 15a in FIG. 1.

Similarly, a preprocessing circuit 20b conducts to an electrical signal from CDS 13b, various correction processing and other processings, which processings are included in processing to be conducted prior to input into video signal producing portions 300, such as gain control processing as conducted by AGC amplifier 14b and AGC control circuit 15b in FIG. 1.

As opposed to switching control circuit 5 shown in FIGS. 1 and 2, switching control circuit 50 is controlled by a synchronizing signal generated by synchronizing signal generator 250 and controls switching circuit 3 so that the output signal of conversion portion 200a and the output signal of conversion portion 200b are alternately selected for every 1 field.

Video signal producing portion 300 has a structure similar to video signal producing portion 300 shown in FIG. 1. An encoder 350 corresponds to circuits 18 and 19 for producing a luminance signal Y and circuits 100–113, 118 and 119 for producing a chroma signal C among the internal circuits of video signal producing portion 300 shown in FIG. 1. The luminance signal Y and chroma signal C produced by encoder 350 are both applied to recording portion 400.

Figure 5:
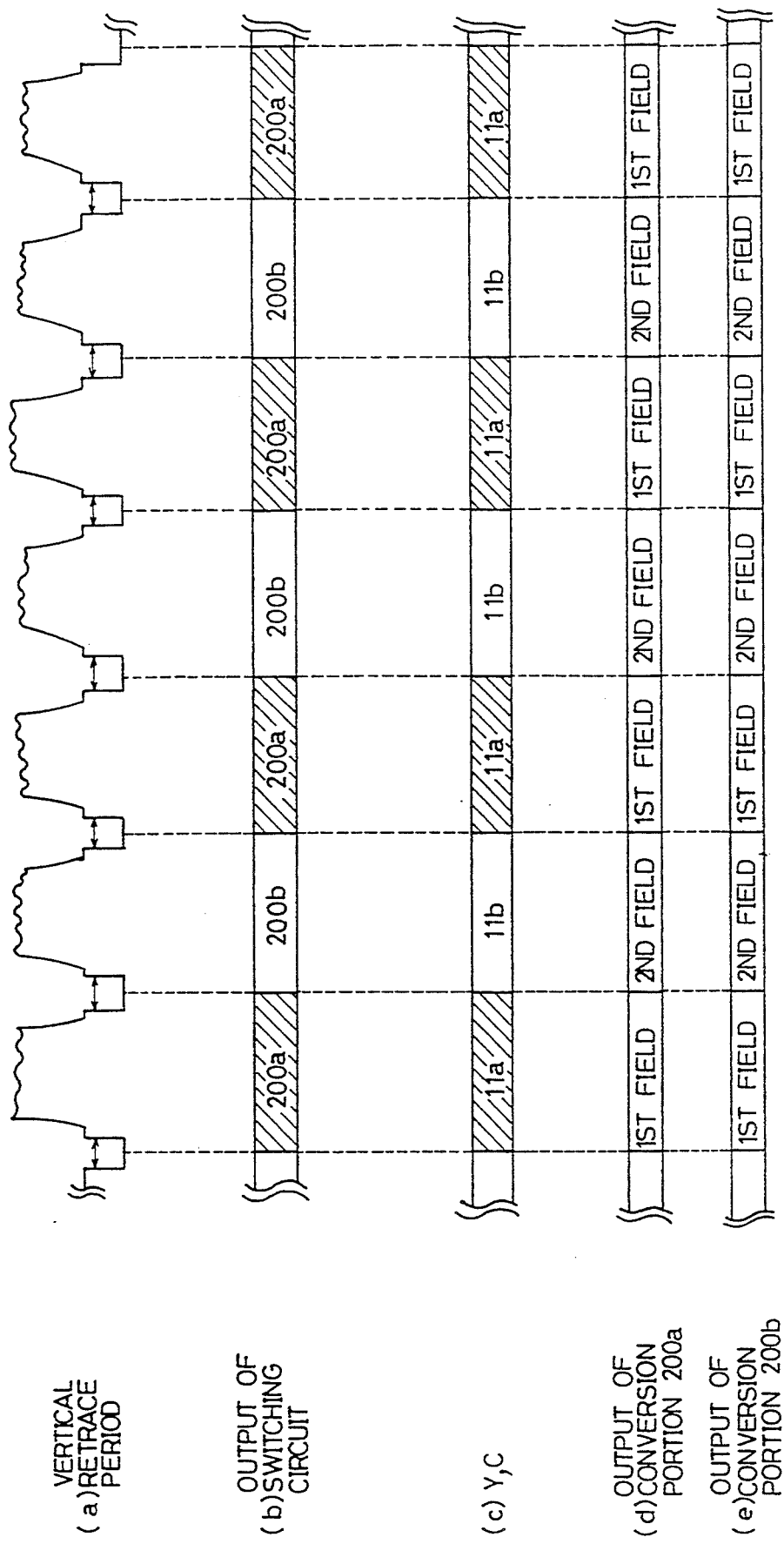
FIG. 5 is a timing chart for illustrating the switching timing of an output signal from switching circuit 3 in FIG. 4.

FIG. 5 is a timing chart for illustrating the switching timing of signals applied to video signal producing portion 300 from switching circuit 3.

Referring to FIG. 5, switching control circuit 50 switches the internal connection state of switching circuit 3 during each vertical blanking period of the video signal (FIG. 5 (a)) produced by video signal producing portion 300. Thus, the output signal of conversion portion 200a and the output signal of conversion portion 200b are switched for every 1 field period of the video signal and alternately applied to video signal producing portion 300 (FIG. 5 (b)).

Therefore, the luminance signal Y and chroma signal C corresponding to the object image captured by lenses 11a and the luminance signal Y and chroma signal C corresponding to the object image captured by lenses 11b are switched for every one field period and alternately applied to recording portion 400.

Figure 8:
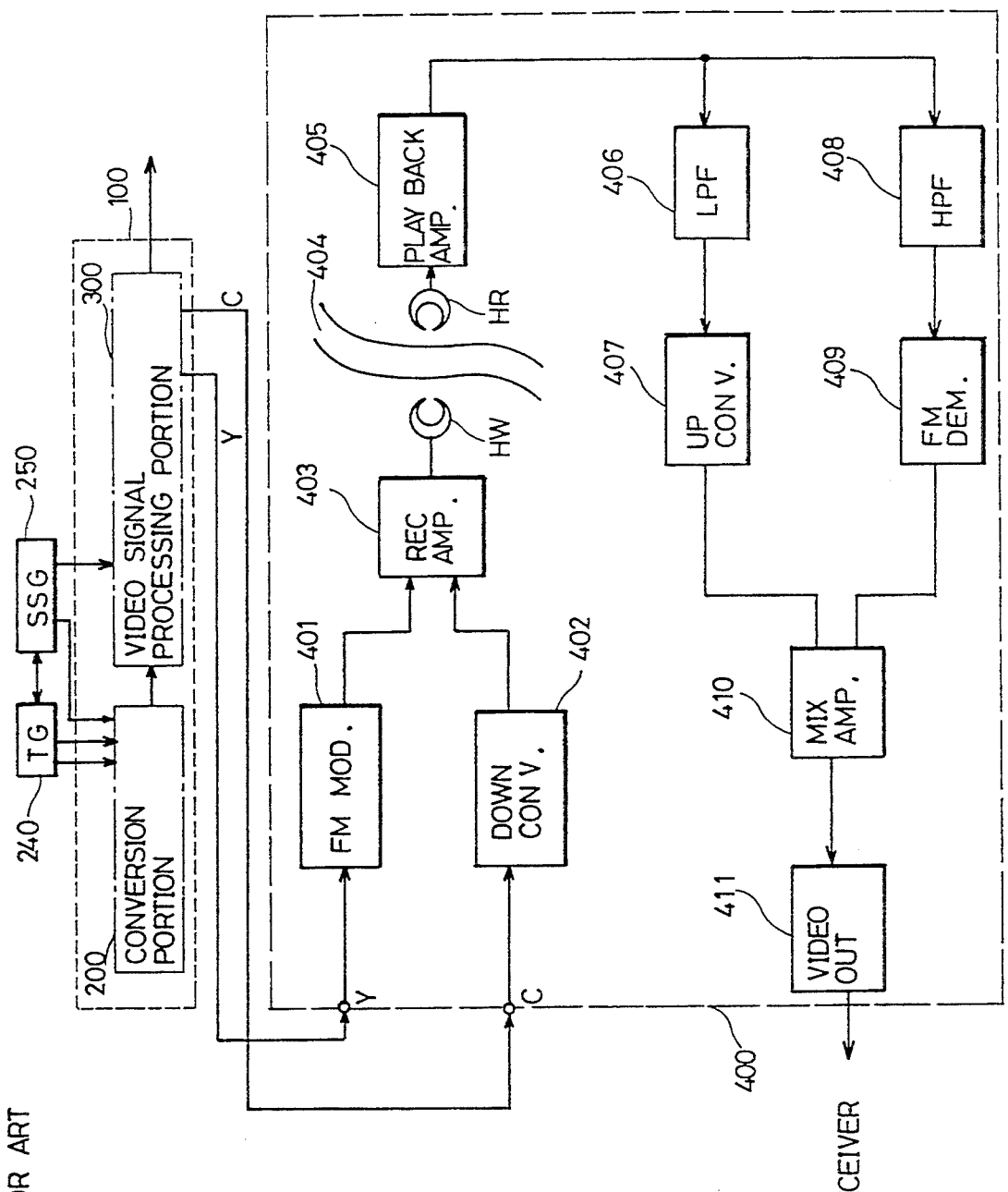
FIG. 8 is a block diagram schematically showing the entire structure of a conventional video tape recorder.

Recording portion 400 includes, in addition to the structure of recording portion 400 in FIG. 8, a field memory 412, a switching circuit 413, a switching control circuit 415 for controlling switching circuit 413, and an external switch 8 used by the user for operating switching control circuit 415. The structures and the operations of the other parts of recording portions 400 are similar to conventional ones, except for field memory 412, switching circuit 413, switching control circuit 415, and external switch 8.

Figure 6:
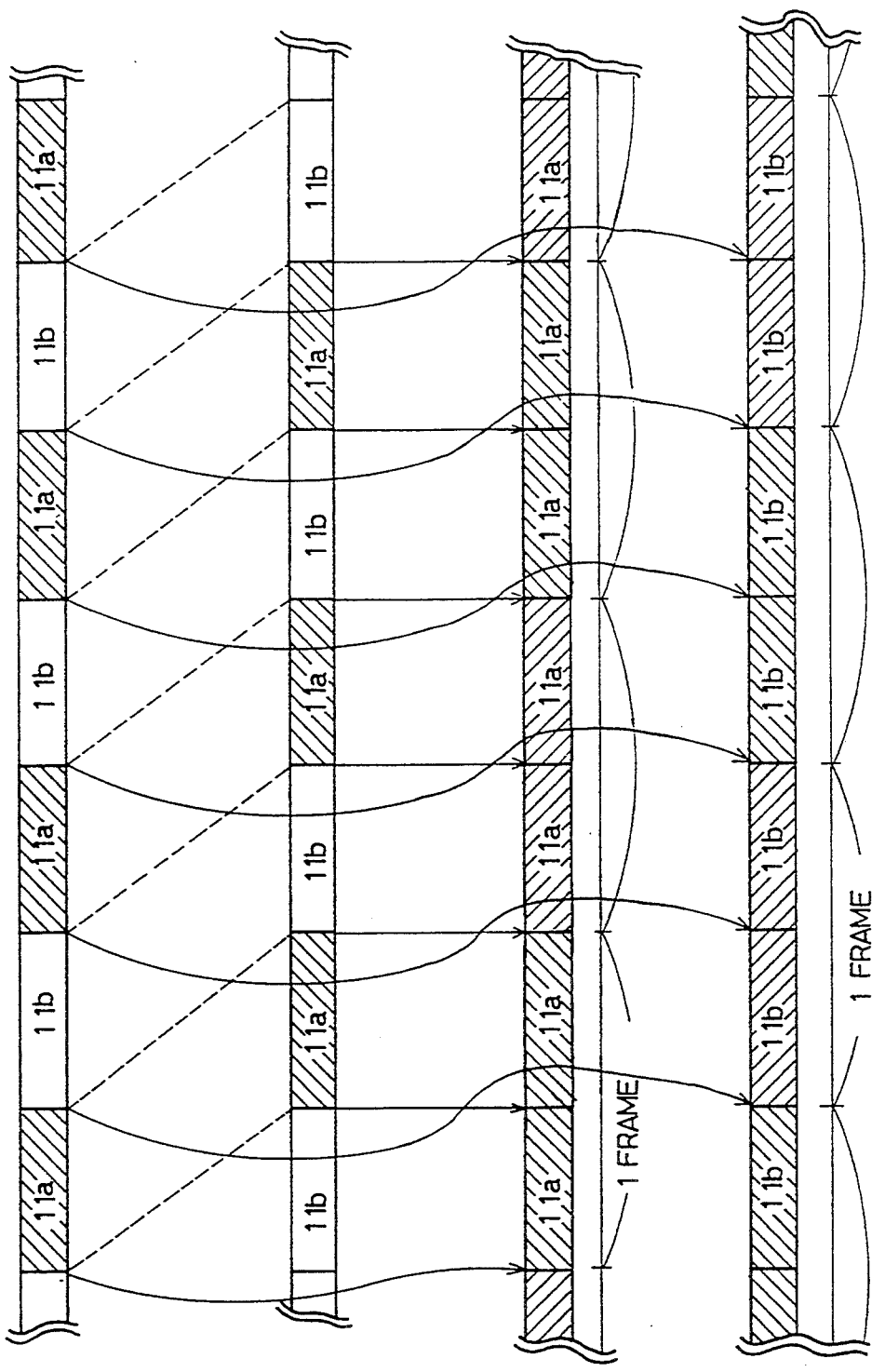
FIG. 6 is a timing chart for illustrating the switching timing of an output signal from switching circuit 3 in FIG. 4.

FIG. 6 is a timing chart for illustrating the switching timing of a signal applied to output circuit 411 from switching circuit 413. In the following description, FIG. 6 is also referred to.

A video signal corresponding to an object image captured by lenses 11a and a video signal corresponding to an object image captured by lenses 11b are alternately precoded on a magnetic tape 404 by one by one basis. Thus, at the time of reproduction, the video signal corresponding to the object image captured by lenses and the video signal corresponding to the object image captured by lenses 11b are alternately output from mixing amplifier 410 each for 1 picture plane (see FIG. 6 (a)).

Field memory 412 after storing the video signal from mixing amplifier 410 on 1 field basis reads the stored signal and applies the read signal to switching circuit 413. The output signal of field memory 412 as shown in FIG. 6 (b), is a signal 1 field period delayed from the output signal (see FIG. 6 (a)) of mixing amplifier 410.

Switching control circuit 415, in response to a key input to external switch 8, controls the internal connection state of switching circuit 413 so that the output signal of field memory 412 and the output signal of mixing amplifier 410 each for 1 field are alternately applied to output circuit 411.

External switch 8 includes, for example, an operation key 810 for reproducing an object image captured by lenses 11a among images recorded as a video signal on magnetic tape 404, and an operation key 820 for reproducing an object image captured by lenses 11b.

Switching control circuit 415 in response to a key input to operation key 810 controls switching circuit 413 so that the output signal of mixing circuit 410 is applied to output circuit 411 during the period when the output signal of mixing amplifier 410 is a video signal corresponding to the object image captured by lenses 11a and the output signal of field memory 412 is applied to output circuit 411 in the other periods. As can be seen from FIGS. 6 (a) and (b), when the output signal of mixing amplifier 410 is switched from the video signal for 1 field of the object image captured by lenses 11a to the video signal corresponding to the object image captured by lenses 11b, a signal the same as the video signal for this 1 field is output from field memory 412.

Accordingly, among video signals recorded on magnetic tape 404 the video signal of the object image captured by lenses 11a is serially output twice from switching circuit 413 for 1 field, and therefore only the video signal of the object image captured by lenses 11a is supplied to output circuit 411.

In response to a key input to operation key 820, switching control circuit 415, as opposed to the foregoing, control switching circuit 413 so that the output signal of mixing amplifier 410 is applied to output circuit 411 during the period when the output signal of mixing amplifier 410 corresponds to the object image captured by lenses 11b while the output signal of field memory 412 is applied to output circuit 411 during the other periods.

When the output signal of mixing amplifier 410 is switched from the video signal for 1 field of the object image captured by lenses 11b to the one corresponding to the object image captured by lenses 11a, a video signal the same as the video signal for this 1 field is output from field memory 412 (see FIGS. 6 (a) and (b)). Therefore in this case, as shown in FIG. 6 (b) the video signal of the object image captured by lenses 11b among the video signals recorded on magnetic tape 404 is serially output by 1 field twice, and, therefore only the video signal of object image captured by lenses 11b is supplied to output circuit 411.

Operating operation key 810 therefore allows reproduction of the object image captured by lenses 11a while operating operation key 820 allows reproduction of the object image captured by lenses 11b.

As in the foregoing, in accordance with the camcorder of the present embodiment, the video signal of the object image captured by lenses 11a and the video signal of the object image captured by lenses 11b are alternately recorded on magnetic tape 404 by 1 field at the time of recording and either one of the-object image captured by lenses 11a and the object image captured by lenses 11b is selectively reproduced, by applying the video signal read from magnetic tape 404 and the signal obtained by delaying the video signal for time period corresponding to 1 field period while switching between these signals by an appropriate timing at the time of reproduction.

At the time of recording, each of the output signals of conversion portions 200a and 200b is applied to video signal producing portion 300 for every 1 field period. Accordingly, in the case of interlace method, the luminance signal Y and chroma signal C of the object image captured by lenses 11a is produced only from one field (first field) signal of two field (hereinafter referred to a first field and a second field) constituting each frame among output signals of conversion portion 200a (FIG. 6 (d)). Similarly, the luminance signaly and chroma signal C of the object image captured by lenses 11b are produced only from the signal of the second field among the output signals of conversion portion 200b (FIG. 6 (e)).

More specifically, a signal corresponding to either one of the first and second fields is removed each from of the output signals of conversion portions 200a and 200b at the time of recording. A video signal for each field recorded on magnetic tape 404 is therefore serially applied twice to output circuit-411 for interpolating signals which can replace the removed video signals of the second field between the first field video signals of the object image captured by lenses 11a among video signals recorded on magnetic tape 404 and for interpolating the signal which can replace the removed video signals of first field video signal between the second field video signals of the object image captured by lenses 11b among the video signals recorded on magnetic tape 404.

More specifically, in this embodiment, the interlaced video signal of the first (or second) field at the time of recording is substituted by the not interlaced video signal of the second (or first) field at the time of reproduction. Each frame of the output video signal of output circuit 411 is constituted by two fields formed of the same video signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus, comprising:
    a first optical system for taking up first external light forming the optical image of a first object;
    a second optical system for taking up second external light forming the optical image of a second object;
    first conversion means for converting the optical image of the first object formed by said first external light taken up by said first optical system into a first electrical signal;
    the first conversion means including
        first generation means for generating an electrical signal at a gain level in accordance with the intensity of said first external light taken up by said first optical system, and
        first level control means for controlling a gain level of the electrical signal generated by said first generation means to a prescribed gain level;
    second conversion means for converting the optical image of the second object formed by said second external light taken up by said second optical system into a second electrical signal;
    the second conversion means including
        second generation means for generating an electrical signal at a gain level in accordance with the intensity of said second external light taken up by said second optical system, and
        second level control means for controlling the gain level of the electrical signal generated by said second generation means to said prescribed gain level;
    electrical signal selection means for selecting one of said first electrical signal converted by said first conversion means and said second electrical signal converted by said second conversion means; and
    video signal producing means for producing a video signal based on the electrical signal selected by said electrical signal selection means.

2. The image sensing apparatus as recited in claim 1, wherein
    said first optical system includes first lens means for emitting said first external light upon said first generation means, and first incident light amount control means for controlling the amount of incident light from said first lens means to said first generation means at a prescribed amount, and
    said second optical system includes second lens means for emitting said second external light upon said second generation means, and second incident light amount control means for controlling the amount of incident light from said second lens to said second generation means at said prescribed amount.

3. The image sensing apparatus as recited in claim 2, wherein
    said first incident light amount control means includes iris means provided between said first lens means and said first generation means, and
    said second incident light amount control means includes iris means provided between said second lens means and said second generation means.

4. The image sensing apparatus as recited in claim 1, wherein
    said first electrical signal includes a color signal component indicating color information on said first object,
    said second electrical signal includes a color signal component indicating color information on said second object,
    said video signal producing means includes extraction means for extracting said color signal component from said selected electrical signal, and white balance adjustment means for controlling the gain of the color signal component extracted by said extraction means for white balancing adjustment, and
    said white balance adjustment means controls the gain of said extracted color signal component based on a first value when said selected electrical signal is said first electrical signal, and controls the gain of said extracted color signal component based on a second value when said selected electrical signal is said second electrical signal.

5. The image sensing apparatus as recited in claim 4, wherein
    said first value is predetermined in accordance with the optical characteristics of said first optical system and said first conversion means so that the video signal produced by said video signal producing means allows reproduction of a white-balanced image when said selected electrical signal is said first electrical signal, and
    said second value is predetermined in accordance with the optical characteristics of said second optical system and said second conversion means so that the video signal produced by said video signal producing means allows reproduction of a white-balanced image when said selected electrical signal is said second electrical signal.

6. The image sensing apparatus as recited in claim 5, wherein
    said white balance adjustment means includes;
    first value generation means for generating said first value,
    second value generation means for generating said second value,
    value selection means responsive to the selection operation of said electrical signal selection means for selecting one of said first value generated by said first value generation means and said second value generated by said second value generation means, and
    gain control means for controlling the gain of said extracted color signal component based on the value selected by said value selection means.

7. The image sensing apparatus as recited in claim 1, wherein said first optical system includes first lens means with a variable focal distance, said second optical system includes second lens means with a variable focal distance, and the minimum value of the focal distance of said first lens means is equal to the maximum value of the focal distance of said second lens means.

8. The image sensing apparatus as recited in claim 7, further comprising:

first detection means for detecting that the focal distance of said first lens means becomes minimum, when said selected electrical signal is said first electrical signal; and first selection control means responsive to the detection output of said first detection means for causing said electrical signal selection means to select said second electrical signal.

9. The image sensing apparatus as recited in claim 8, further comprising:

second detection means for detecting that the focal distance of said second lens means becomes maximum, when said selected electrical signal is said second electrical signal; and selection means responsive to the detection output of said second detection means for causing said electrical signal selection means to select said first electrical signal.

10. An image sensing apparatus as recited in claim 1, further comprising:

selection control means for causing said electrical signal selection means to alternately select said first electrical signal and said second electrical signal for every 1 field period;

a recording medium;

recording means for recording the video signal produced by said video signal producing means on said recording medium;

reproduction means for reproducing said video signal from said recording medium;

delay means for delaying the video signal reproduced by said reproduction means by time period corresponding to 1 field period; and switching means for switching between the video signal delayed by said delay means and the video signal reproduced by said reproduction means for every 1 field period for output.

11. The image sensing apparatus as recited in claim 10, further comprising:

first switching timing control means for controlling the switching timing of said switching means so that said reproduced video signal is output from said switching means during the period when said reproduced video signal is a video signal produced by said video signal producing means based on said first electrical signal, and said delayed video signal is output from said switching means during the other periods; and second switching timing control means for controlling the switching timing of said switching means so that said reproduced video signal is output from said switching means during the period when said reproduced video signal is a video signal produced by said video signal producing means based on said second electrical signal, and said delayed video signal is output from said switching means during the other periods.

12. The image sensing apparatus as recited in claim 10, wherein said delay means is a field memory.

* * * * *